United States Patent
Kobayashi

[19]
[11] Patent Number: 6,122,764
[45] Date of Patent: *Sep. 19, 2000

[54] DISC RECORDING MEDIUM FOR REPRODUCTION DATA FROM DISC RECORDING MEDIUM

[75] Inventor: Shoei Kobayashi, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/984,729

[22] Filed: Dec. 4, 1997

[30] Foreign Application Priority Data

Dec. 11, 1996 [JP] Japan ..................... 8-331279

[51] Int. Cl.⁷ ................................. H03M 13/00
[52] U.S. Cl. .................. 714/758; 714/723; 714/731; 714/752; 714/6; 714/775; 714/805; 714/819; 714/755
[58] Field of Search .................. 714/755, 752, 714/723, 731, 775, 805, 719, 758, 753–759, 6; 386/109, 111, 112

[56] References Cited

U.S. PATENT DOCUMENTS

| | | | |
|---|---|---|---|
| 4,680,764 | 7/1987 | Suzuki et al. | 714/756 |
| 5,148,421 | 9/1992 | Satoh et al. | 369/44.23 |
| 5,377,051 | 12/1994 | Lane et al. | 386/81 |
| 5,381,292 | 1/1995 | Richemond | 361/128 |
| 5,430,741 | 7/1995 | Fukami | 714/155 |
| 5,612,933 | 3/1997 | Iso et al. | 369/32 |
| 5,720,030 | 2/1998 | Kamihara et al. | 395/183.18 |
| 5,778,257 | 7/1998 | Tsukatani et al. | 395/894 |

FOREIGN PATENT DOCUMENTS

| | | |
|---|---|---|
| 0 144 436 A1 | 6/1985 | European Pat. Off. . |
| 0 439 100 A2 | 7/1991 | European Pat. Off. . |

OTHER PUBLICATIONS

Toyama et al., "Hash–Based Symmetric Data Structure and Join Algorithm for OLAP Application", IEEE., pp. 231–238, 1999.

Korenari et al., "analysis of Track–Edge Noise in Thin–Film Recording Media", IEEE., pp. 2509–2512, Jul. 1997.

Kant et al., "The Writing Process in Maggneto–Optical Recording", IEEE., pp. 321–328, 1999.

K.A. Schouhamer Immink: "The Digital Versatile Disc (DVD): System Requirements and Channel Coding", SMPTE Journal, Aug. 1, 1996, pp. 483–489.

*Primary Examiner*—William Grant
*Assistant Examiner*—McDieunel Marc
*Attorney, Agent, or Firm*—Frommer Lawrence & Haug, LLP.; William S. Frommer; Dexter T. Chang

[57] ABSTRACT

A disc recording medium is provided for enhancing a capability of correcting a burst error caused by small dust left on the surface of a disc substrate. The data of two-dimensionally arrayed ECC blocks consisting of 172 words× 192 rows contains the PI parity and the PO parity added in the two error-correcting systems. The PI parity is intended for error correction for data arranged to go down by one row with advance of one word in the direction of a bit stream. The PI parity is intended for going back to the first row when the data being interleaved exceeds 192 rows. The PO parity is intended for error correction for data arranged to interleave the data perpendicularly to the bit stream.

20 Claims, 5 Drawing Sheets

DISC RECORDING MEDIUM FOR REPRODUCTION DATA FROM DISC RECORDING MEDIUM

BACKGROUND OF THE INVENTION

1. Field of the Invention

The present invention relates to a disc recording medium having a function of error-correcting data to be recorded on the medium and an apparatus for reproducing the data from the disc recording medium.

2. Description of the Related Art

In a case that a recording medium such as an optical disc contains defects or dust adhering to a recording plane of the disc, an error takes place on the data to be reproduced from the recording medium. This error makes the servo operation unstable and thereby brings about a further data error. In general, the data recorded on the optical disc is recorded together with parity bits used for error correction.

For example, consider an optical disc such as a digital video disc whose recording capacity is on the several giga bytes level. This kind of optical disc is arranged to perform error correction about each unit data of 32 KB. This error correction unit is referred to as an ECC block.

FIG. 1 is a model view showing a format of an ECC block of the optical disc. This ECC block is composed of a two-dimensional array consisting of 172 words×192 rows and contains parity bits added in two error-correcting systems. The format of this ECC block is arranged to add parity bits for ten words of 172 words in the direction of the bit stream of the data, that is, the direction of C1 shown in FIG. 1. (These parity bits in the C1 direction are referred to as a PI parity.) The format of this ECC block is arranged to range 192 rows each of which is composed of 172 words and the PI parities corresponding to ten words and add parity bits for 16 words in the direction perpendicular to the bit stream, that is, in the C2 direction shown in FIG. 1. (These parity bits in the C2 direction are referred to as a PO parity.) These PI and PO parities are used when the data is error-corrected by a RSPC (Reed Solomon Product Code).

On the other hand, in recent days, an optical disc is now being required for enhancing its density, for the purpose of recording a larger capacity of data than the digital video disc. In order to enhance the density of the optical disc, it is necessary to keep a spot size of a laser beam to be projected onto the recording medium smaller than the conventional size.

The spot size of the laser beam has a radius R expressed as shown in the following expression (1).

$$R = 0.32\lambda/NA \qquad (1)$$

where NA denotes a numeric aperture and $\lambda$ denotes a wavelength of the laser beam.

As represented in this expression (1), for reducing the radius R of the spot size of the laser beam in size, it is necessary to shorten the wavelength $\lambda$ of the laser beam or enlarge the numeric aperture NA of an objective lens.

When the numeric aperture NA of the objective lens is made larger, however, the aberration is made so large that the signal cannot be recorded or reproduced from the recording medium. As one of the solving methods, it is known that the disc substrate is made so thin that the aberration becomes lower.

If the thickness of the disc substrate is made thinner, as mentioned above, the aberration is lower. However, small dust left on the surface of the disc substrate brings about data error though such small dust conventionally has no influence on the recording and reproduction of the optical disc.

FIG. 2 is a graph showing an error propagation of an error against a diameter of dust left on the surface of the disc substrate as the thickness of disc substrate is changing. In this graph, an axis of abscissa denotes a diameter of dust left on the surface of the disc substrate, while an axis of ordinates denotes a propagating distance of error, in which the unit is a micrometer order. The error propagating length is calculated on the assumption that an error takes place when an amplitude of a RF signal output from a photo detector to which the reflected laser beam is applied is 55% or less. It is grasped from the graph shown in FIG. 2 that no error takes place if a dust diameter is about 300 micrometer or less when the thickness of the disc substrate is 1.2 mm. This thickness corresponds to the thickness of the so-called compact disc. Further, it is also grasped from the graph of FIG. 2 that no error takes place if the dust diameter is about 150 micrometer or less when the thickness of the disc substrate is 0.6 mm. This thickness corresponds to the thickness of the so-called digital video disc.

Further, when the thickness of the disc substrate is 0.3 mm, the error propagating length is 200 micrometer when the dust diameter is about 100 micrometer. When the thickness of the disc substrate is 0.15 mm, the error propagating length is 60 micrometer when the dust diameter is about 20 micrometer. Further, when the thickness of the disc substrate is 0.02 mm, the error propagating length is several tens micrometer when the dust diameter is about several micrometers.

As mentioned above, this graph has indicated that even dust of such a diameter as giving no influence when the disc substrate has a conventional thickness such as 1.2 mm or 0.6 mm is likely to have influence on the data recording or reproduction. Hence, even small dust left on the surface of the disc substrate brings about a data error though it does not conventionally have any influence on the data recording and reproduction.

SUMMARY OF THE INVENTION

The present invention is made in consideration of the foregoing condition. It is an object of the present invention to provide a disc recording medium which provides a higher capability of correcting a burst error against small dust left on the surface of the disc substrate and an apparatus for recording and reproducing data from the disc recording medium.

According to a first aspect of the invention, a disc recording medium for recording data containing parity bits generated on error-correcting blocks consisting of a two-dimensional data array in two error-correcting systems includes a first one of the error-correcting systems arranged to interleave in a different direction from direction of data for adding the parity bits; and a second one of the error-correcting systems arranged to interleave in the different direction from the direction of data and the first error-correcting system for adding the parity bits.

The disc recording medium is arranged to interleave the data in the two error-correcting system that are directed from the direction of data for adding parity bits and to error-correct the errors caused if an error resulting from dust left on the recording plane takes place in the reproduced data in the two error-correcting systems.

According to a second aspect of the invention, a reproducing apparatus for a disc recording medium includes: a reproducing unit for reproducing data from the disc recording medium, the disc recording medium for recording data having parity bits generated on error-correcting blocks of a two-dimensional data array in the two error-correcting systems, a first one of the error-correcting systems being arranged to interleave in a different direction from direction of the data for adding the parity bits, and a second one of the error-correcting systems being arranged to interleave in a different direction from the direction of the data and the direction of the first error-correcting system for adding the parity bits; a storing unit for storing the data reproduced by the reproducing unit at the two-dimensionally arrayed error-correcting block unit; first error-correcting means for de-interleaving data stored in the storing unit in the direction corresponding to the second error-correcting system and for doing error correction based on the parity bits; and second error-correcting means for de-interleaving data stored in the storing unit in the direction corresponding to the first error-correcting system and for doing error correction based on the parity bits.

In operation, the reproducing apparatus for a disc recording medium is served to error-correct an error resulting from dust on the recording plane if it takes place in the reproduced data, based on the parity bits interleaved in the two error-correcting systems directed differently from the direction of the data.

BRIEF DESCRIPTION OF THE DRAWINGS

These and other features, aspects, and advantages of the present invention will become more readily apparent from the following detailed description, which should be read in conjunction with the accompanying drawings in which.

DESCRIPTION OF THE PREFERRED EMBODIMENTS

Hereafter, an embodiment of the invention will be described with reference to the appended drawings.

The optical disc according to the embodiment of the invention has a larger storage capacity than the digital video disc and has a thickness of 0.3 mm or less, for example.

This optical disc contains a data block of 32 KB as one unit. A parity bit is added to each data block. The format of the data of this optical disc will be described below.

Figure 1:
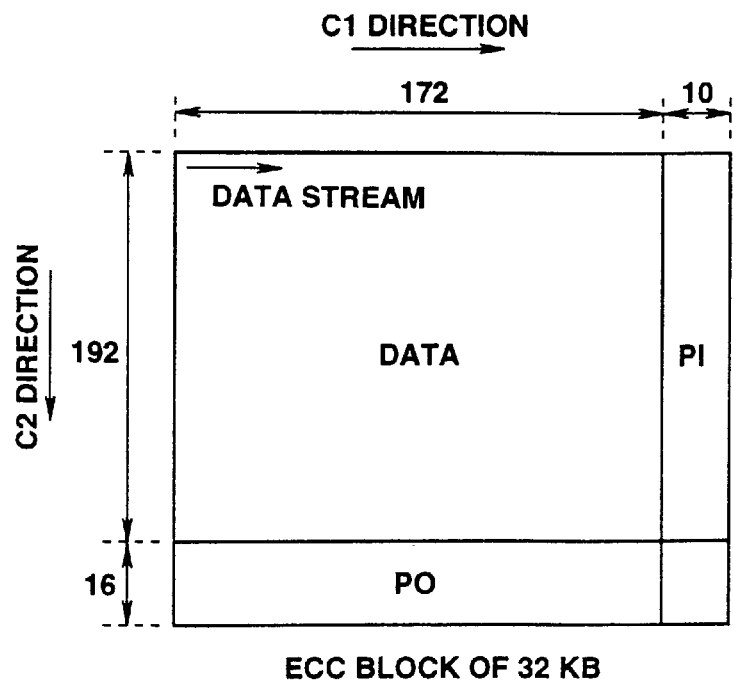
FIG. 1 is an explanatory view showing a format of an ECC block contained in a conventional optical disc.
Figure 2:
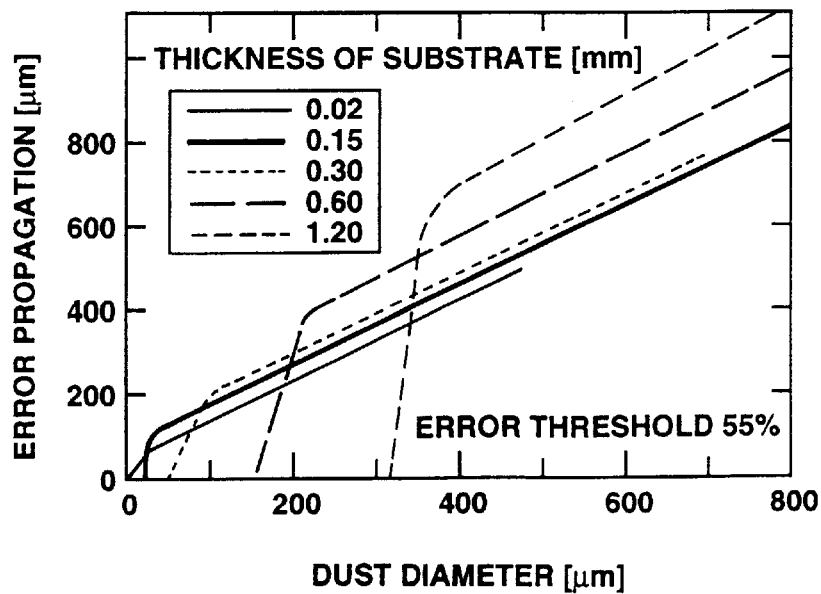
FIG. 2 is a graph showing an error propagating length against a diameter of dust left on the surface of a disc substrate as the thickness of the disc substrate is changing.
Figure 3:
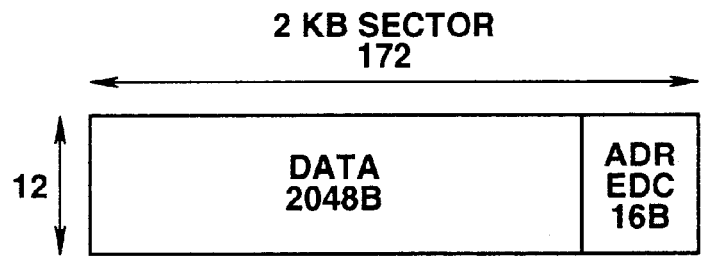
FIG. 3 is an explanatory view showing a sector of an optical disc according to the present invention.

The data recorded on the optical disc according to the invention is made up of sectors each of which is composed of data of 2 KB. As shown in FIG. 3, concretely, this sector is composed of data of 2048 bytes, a sector address (ADR) of 16 bytes and an error-detecting code (EDC).

The data recorded on this optical disc is error-corrected at a 16-sector unit. The error-correcting unit is referred to as an ECC block.

Figure 4:
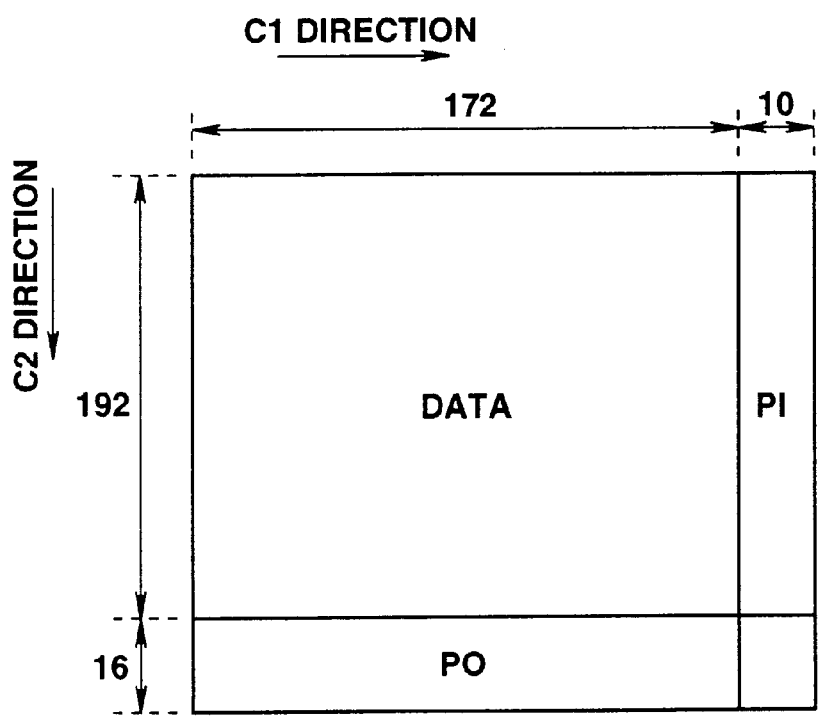
FIG. 4 is an explanatory view showing a format of an ECC block contained in the optical disc according to the present invention.

As shown in FIG. 4, the format of this ECC block is arranged so that 172 words of each block are ranged in the direction of bit stream, that is, the C1 director shown in FIG. 4. The 192 rows each of which is composed of 172 words are ranged in the direction perpendicular to the bit stream, that is, the C2 direction shown in FIG. 4.

The two-dimensionally arranged data consisting of 172 words×192 rows contains parity bits to be added in two error-correcting systems. These two kinds of error-correcting system parity bits are given by error-correcting the data with the RSPC (Reed Solomon Product Code). One kind of parity bits is called PI parity and the other kind of parity bits is called PO parity.

The PI parity is added to the data block of 172 words and is compose of ten words. The PO parity is added to the data block of 192 words and is composed of 16 words. These PI and PO parities are added by doing the interleaving operation in the direction of the bit stream.

Figure 5:
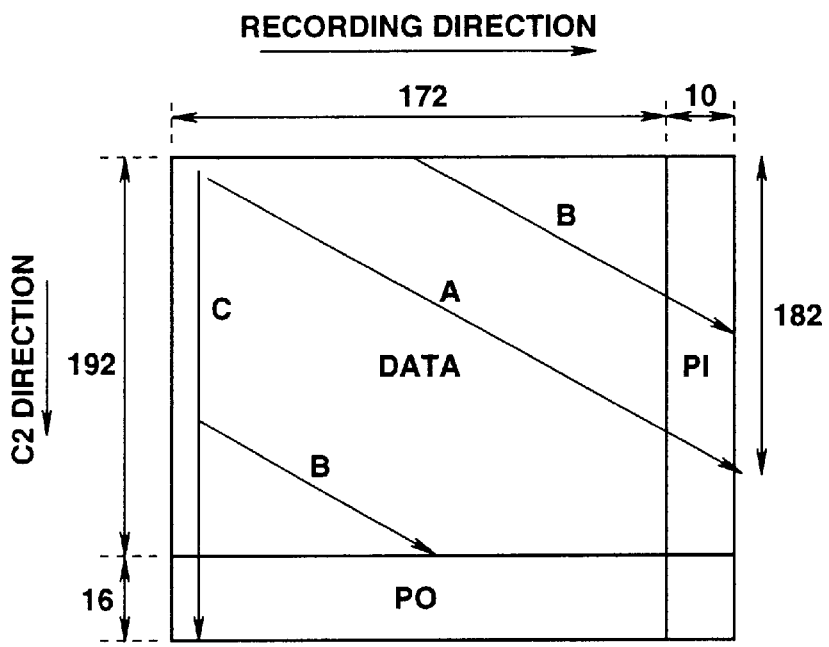
FIG. 5 is a view showing the interleaving direction of parity bits to be added to the ECC block.

As shown in an arrow A of FIG. 5, the PI parity is given to the data arranged to go down by one row as it goes by one word in the direction of a bit stream. The PI parity is given to the data interleaved downward in the right slanting direction against the bit stream as viewed in FIG. 5. When the data being interleaved exceeds 192 rows, as shown by an arrow B of FIG. 5, the PI parity goes back to the first row and then advances the interleave again. As shown by an arrow C of FIG. 5, the PO parity is given to the data being interleaved in the direction perpendicular to the bit stream.

Figure 6:
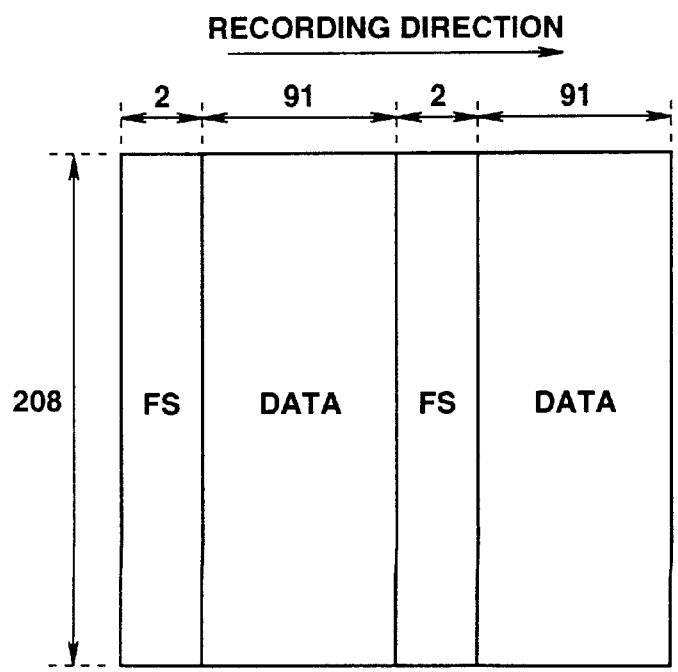
FIG. 6 is an explanatory view showing a frame synchronization to be added to the ECC block.

The ECC block contains a frame sync added at each group of 91 words as shown in FIG. 6. This ECC block is recorded on the track.

Hence, the optical disc according to the invention is arranged so that the two error-correcting systems of the ECC block have the corresponding interleave length directed in different ways against the recording direction. Hence, if a frequency of a short burst error is increased, the error can be randomized in different ways so that the error correction is made stronger accordingly.

In turn, the description will be oriented to an optical disc recording apparatus for recording data on the foregoing optical disc and an optical disc reproducing apparatus for reproducing data from this optical disc.

Figure 7:
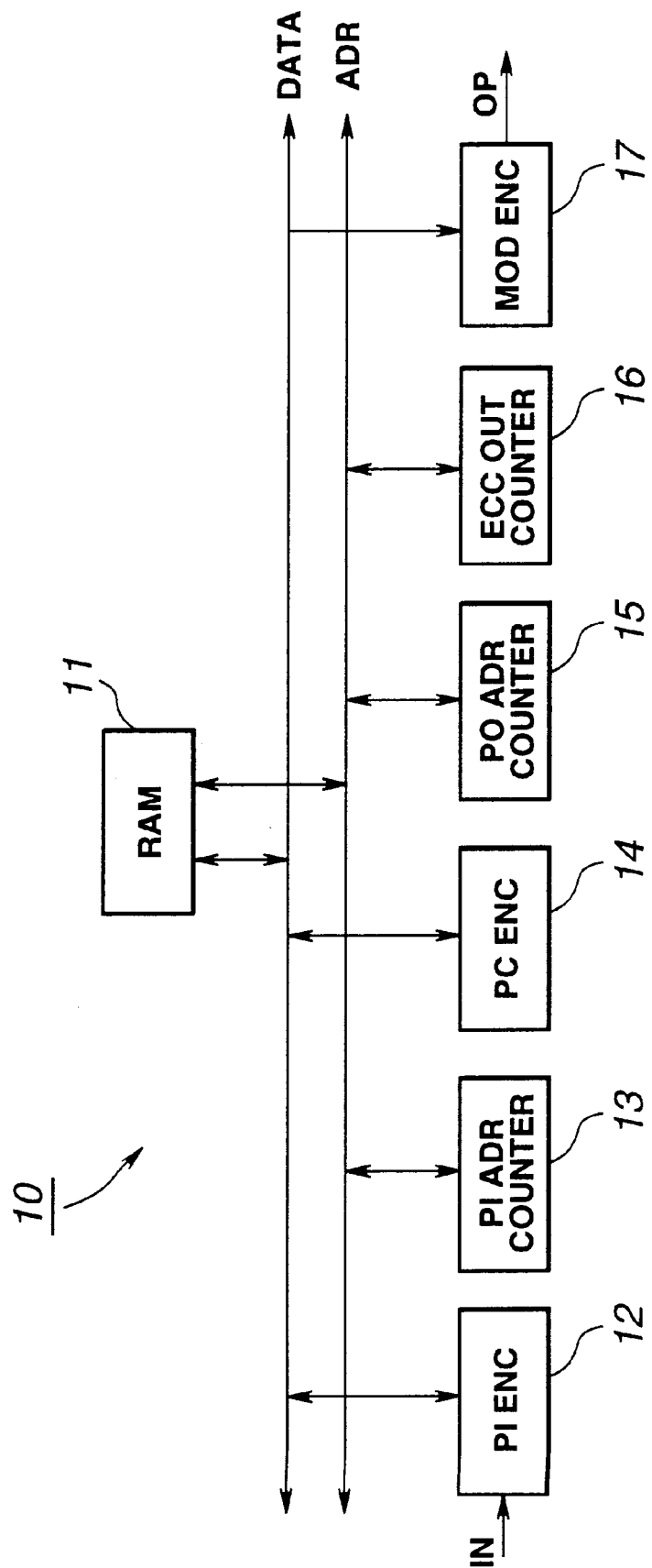
FIG. 7 is a block diagram showing a recording apparatus for an optical disc for recording data from an optical disc according to the present invention.

As shown in FIG. 7, the optical disc recording apparatus 10 provides a PI encoder 12, a PO encoder 14 and a modulator 17 on a data bus as well as a PI address counter 13, a PO address counter 15 and an ECC out counter 16 on an address bus. Further, a random access memory 11 is also provided so that the memory 11 is connected to the data bus and the address bus.

The PI encoder 12 is inputted with video data to be recorded on the optical disc from an external device. The PI encoder 12 operates to divide the inputted data into 32-KB blocks and then sequentially put the blocks into the random access memory 11. The 32-KB block is the error-correcting unit.

When the random access memory 11 stores data of ECC blocks each consisting of 32 KB, the PI encoder 12 operates to count an address of the ECC block stored in the random access memory 11 and then supply the data of the counted address to the PI encoder 12. In the counting operation, the PI address counter 13 operates to interleave the two-dimensionally arrayed ECC blocks downward in the right slanting direction.

The PI encoder 12 operates to perform an operation of a given error-correcting code (PI parity) with respect to the supplied data and then supply this PI parity to the random access memory 11. When all PI parities are obtained about the data of ECC blocks, the PO address counter 15 operates to count the addresses of the ECC blocks stored in the random access memory 11 and then supply the data of the counted address to the PO encoder 14. In the counting operation, the PO address counter 15 operates to interleave the two-dimensionally arrayed ECC blocks perpendicularly to the bit stream.

The PO encoder 14 operates to perform an operation of a given error-correcting code (PO parity) with respect to the supplied data and then supply the PO parity to the random access memory 11. The PO encoder 14 operates to perform an operation of the PO parity about the PI parity obtained by the PI encoder 12 and then put it into the random access memory 11.

When all PO parities are obtained about the data of ECC blocks, the ECC out counter 16 operates to add the address to the ECC block having the PI parity and the PO parity added thereto. Then, the ECC out counter 16 operates to supply the data from the random access memory 11 to the modulator 17 at an ECC block unit.

The modulator 17 operates to add a frame synchronization to the ECC block data containing the address added thereto, perform a given modulation with respect to the resulting data and then supply it to a recording circuit such as a light pickup unit. The recording circuit operates to record the data on the optical disc. Hence, the optical disc recording apparatus 10 operates to add parity bits having interleave lengths directed in the two error-correcting systems differently from the recording direction when recording the data on the optical disc. As such, the optical disc recording apparatus 10 operates to randomize the error if a frequency of a short burst error is increased, for the purpose of implementing a strong error correction.

Figure 8:
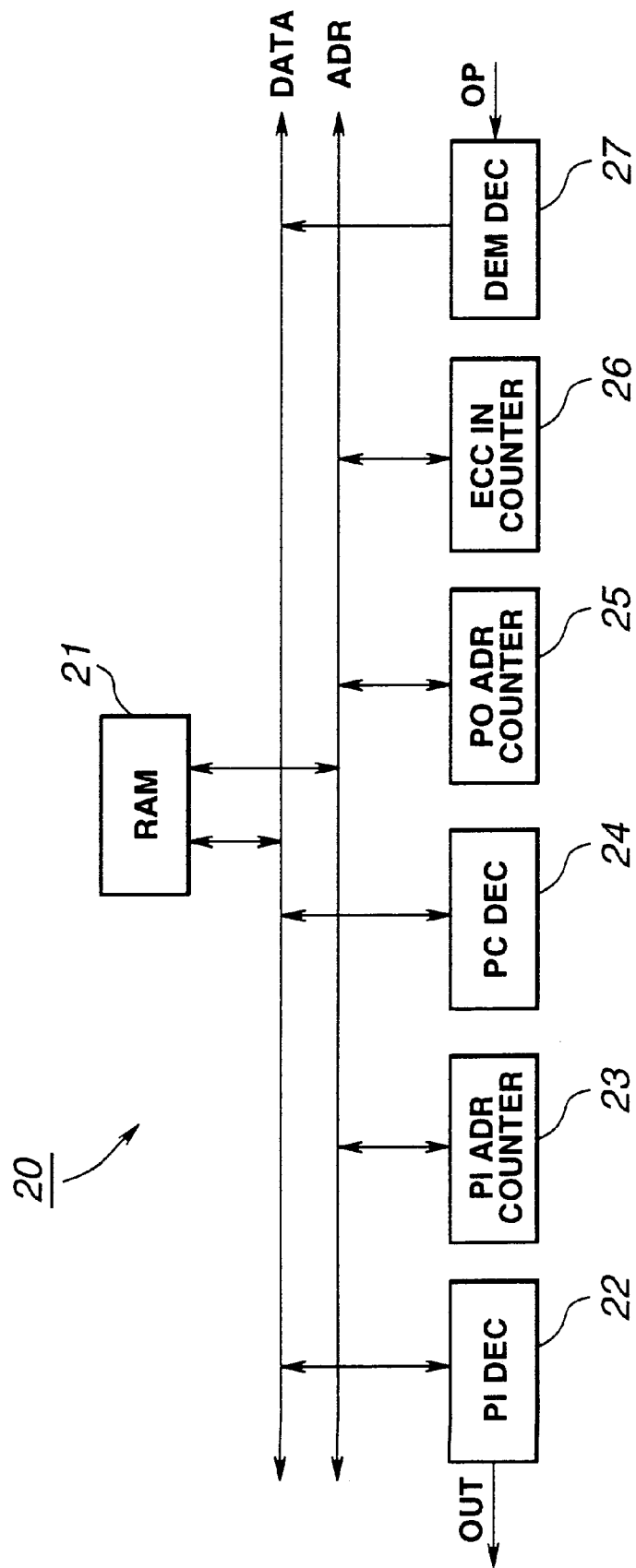
FIG. 8 is a block diagram showing a reproducing apparatus for an optical disc for reproducing data from an optical disc according to the present invention.

On the other hand, as shown in FIG. 8, the optical disc reproducing apparatus 20 provides a PI decoder 22, a PO decoder 24 and a demodulator 27 on a data bus and an PI address counter 23, a PO address counter 25 and an ECC in counter 26 on an address bus. A random access memory 21 is further connected to the data bus and the address bus.

The demodulator 27 is inputted with a reproduction signal of the optical disc from a reproducing circuit such as a light pickup unit. The demodulator 27 operates to demodulate the reproduction signal from the light pickup unit in a predetermined modulating system and remove the frame synch added to the reproduction signal.

The ECC in counter 26 operates to count the data demodulated by the demodulator 27 at an ECC block unit and sequentially supply the ECC block data to the random access memory 21.

The random access memory 21 stores the data supplied from the demodulator 27. The data stored in the random access memory 21 contains the PI parity and the PO parity added thereto.

When the random access memory 21 stores all data of ECC blocks each consisting of 32 KB, the PO address counter 25 operates to count the address of the ECC block stored in the random access memory 21 and supply the data block of the counted address and the PO parity corresponding to the data block to the PO decoder 24. The PO address counter 25 operates to de-interleave the two-dimensionally arrayed ECC blocks perpendicularly to the bit stream when counting the address.

The PO decoder 24 operates to error-correct the supplied data based on the PO parity. The PO decoder 24 operates to supply the data to the random access memory 21 when the correct data is obtained by the error correction. The PO decoder 24 operates to obtain the correct data about the PI parity obtained by the PI encoder 12 and then supply it to the random access memory 21.

When the PO decoder 24 obtains all ECC blocks, the PI address counter 23 operates to count the address of the ECC block stored in the random access memory 21 and supply to the PI decoder 22 the data of the counted address and the PI parity corresponding to the data. The PI address counter 23 operates to de-interleave the two-dimensionally arrayed ECC blocks downward in the right slanting direction when counting the address.

The PI decoder 22 operates to error-correct the data based on the PI parity. After the correct data is obtained by the error correction, the PI decoder 22 operates to supply this correct data to the external device such as a reproducing device for video data.

Hence, the optical disc reproducing apparatus 20 operates to de-interleave the data of the ECC blocks having different interleave lengths from the recording direction of the optical disc according to the present invention when reproducing the data. The optical disc reproducing apparatus 20 operates to randomize the error if a frequency of a short burst error is increased in the data reproduced from the optical disc, for the purpose of implementing the stronger error correction.

The disc recording medium according to the invention is arranged to interleave the data in the two error-correcting systems that are different from each other and error-correct an error of the reproduced data caused by dust on the recording plane in the two error-correcting systems. Hence, the disc recording medium operates to enhance the correcting capability of a burst error caused by small dust left on the surface of the disc substrate.

The reproducing apparatus for the disc recording medium according to the present invention is arranged to de-interleave the data in the two error-correcting systems that are directed differently from the data stream for the purpose of error-correcting the data and error-correct the error of the reproduced data caused by the dust left on the recording plane in the two error-correcting systems. The reproducing apparatus enables to enhance the correcting capability of a burst error caused by small dust left on the surface of the disc substrate and thereby reduce the error of the reproduced data.

Many widely different embodiments of the present invention may be constructed without departing from the spirit and scope of the present invention. It should be understood that the present invention is not limited to the specific embodiments described in the specification except as defined in the appended claims.

What is claimed is:

1. A recording medium for recording data including a data block arranged in a two-dimensional data array and for recording at least two types of error correction data for error correcting said data block upon reproduction, said recording medium comprising:

a first type of said error correction data generated from data arranged in said data block along a first direction different from a direction in which said data is arranged according to at least one dimension of said data block; and a second type of said error correction data generated from data arranged in said data block along a second direction different from both a direction along either dimension of the data block and the first direction.

2. The recording medium as claimed in claim 1, wherein said recording medium is an optical disc in which the thickness of a disc substrate is 0.3 mm or less.

3. The recording medium according to claim 1, wherein said first and second types of error correction data are parity data.

4. The recording medium according to clam 1, wherein said data block has a row and column format defining said two-dimensional array, wherein said data is recorded sequentially in said rows such that said at least one direction corresponds with a direction in which said rows of said data block are arranged.

5. The recording medium according to claim 4, wherein said first type of error correction data is generated from data in different rows of said data block.

6. The recording medium according to claim 5, wherein said second type of error correction data is generated from data in different rows and columns of said data block.

7. A reproducing apparatus for reproducing data from a recording medium, wherein said data comprises a data block arranged in a two-dimensional data array and at least two types of error correction data for error correcting said data block upon reproduction, wherein a first type of said error correction data is generated from data arranged in said data block along a first direction different from a direction in which said data is arranged according to at least one dimension of said data block and a second type of said error correction data is generated from data arranged in said data block along a second direction different from both a direction along either dimension of the data block and the first direction, said reproducing apparatus comprising:

a reproducing unit for reproducing said data from said recording medium;

a first error-correcting unit for performing error correction on said reproduced data in accordance with said first type of error correction data; and a second error-correcting unit for performing error correction data on said reproduced data in accordance with said second type of error correction data.

8. The reproducing apparatus according to claim 7, wherein said first and second types of error correction data are parity data; and wherein said first and second error-correction units error correct said data block in accordance with said first and second types of error correction data.

9. The reproducing apparatus according to claim 7, wherein said data block has a format of rows and columns, wherein said data is arranged sequentially in said rows such that said at least one direction corresponds with a direction in which said rows of said data block are arranged.

10. The reproducing apparatus according to claim 9, wherein said first type of error correction data is generated from data in different rows of said data block; wherein said first error-correction unit error corrects said data in different rows.

11. The reproducing apparatus according to claim 10, wherein said second type of error correction data is generated from data in different rows and columns of said data block; wherein said error-correction unit error corrects said data in different columns and rows.

12. The reproducing apparatus according to claim 7, wherein said first and second types of error correction data randomize errors such that said first and second error-correction units error correct short burst errors in said data reproduced by said reproduction unit.

13. A recording apparatus for recording data on a recording medium including a data block and at least two types of error correction data for error correcting said data block, said apparatus comprising:

a recording unit for recording said data on said recording medium;

a first error-correction unit for generating a first type of error correction data for error correcting said data block in a first direction different from a direction in which said data is arranged in the data block; and a second error-correction unit for generating a second type of error correction data for error correcting said data block in a second direction different from both said first direction and said direction in which said data is arranged.

14. The recording apparatus according to claim 13, wherein said first and second types of error correction data are parity data; and wherein said first and second error-correction units error correct said data block in accordance with said first and second types of error correction data.

15. The recording apparatus according to claim 13, wherein said data block has a format of rows and columns, wherein said direction in which said data is arranged corresponds with a direction in which said rows of said data block are arranged.

16. The recording apparatus according to claim 15, wherein said first type of error correction data is generated from data in different rows of said data block; wherein said first error-correction unit error corrects said data in different rows.

17. The recording apparatus according to claim 16, wherein said second type of error correction data is generated from data in different rows and columns of said data block; wherein said error-correction unit error corrects said data in different columns and rows.

18. The recording apparatus according to claim 13, wherein said first and second types of error correction data randomize errors such that said first and second error-correction units error correct short burst errors in said data to be reproduced.

19. The recording apparatus according to claim 18, wherein said recording unit records said data on an optical disc having a substrate thickness which, when read by a narrow laser beam, causes said short burst errors.

20. The recording apparatus according to claim 19, wherein said recording unit records said data on an optical disc having said substrate thickness not greater than 0.3 mm.

* * * * *